United States Patent
Wallace et al.

(10) Patent No.: US 8,528,343 B2
(45) Date of Patent: Sep. 10, 2013

(54) METHOD AND APPARATUS TO FACILITATE SUBSTITUTE NATURAL GAS PRODUCTION

(75) Inventors: Paul Steven Wallace, Katy, TX (US); Arnaldo Frydman, Houston, TX (US)

(73) Assignee: General Electric Company, Schenectady, NY (US)

( * ) Notice: Subject to any disclaimer, the term of this patent is extended or adjusted under 35 U.S.C. 154(b) by 1154 days.

(21) Appl. No.: 11/970,184

(22) Filed: Jan. 7, 2008

(65) Prior Publication Data

US 2009/0173079 A1    Jul. 9, 2009

(51) Int. Cl.
*F02C 3/20* (2006.01)
*C01B 3/32* (2006.01)

(52) U.S. Cl.
USPC ......... 60/781; 60/780; 60/39.182; 60/39.464; 48/61; 48/76

(58) Field of Classification Search
USPC .............. 60/39.12, 645, 780, 39.181, 39.183, 60/781, 39.182, 39.464; 48/61, 76, 67, 69
See application file for complete search history.

(56) References Cited

U.S. PATENT DOCUMENTS

| | | | |
|---|---|---|---|
| 2,465,235 A * | 3/1949 | Kubicek | 423/652 |
| 3,441,393 A * | 4/1969 | Multhaup et al. | 423/359 |
| 3,904,386 A * | 9/1975 | Graboski et al. | 48/197 R |
| 3,919,114 A * | 11/1975 | Reynolds | 252/373 |
| 4,017,271 A | 4/1977 | Barclay et al. | |
| 4,235,044 A | 11/1980 | Cheung | |
| 4,392,940 A | 7/1983 | Tao | |
| 4,534,772 A | 8/1985 | Reichl | |
| 4,540,681 A | 9/1985 | Kustes et al. | |
| 4,610,695 A | 9/1986 | Crespin et al. | |
| 4,946,477 A | 8/1990 | Perka et al. | |
| 4,964,881 A | 10/1990 | Sharma et al. | |
| 5,117,623 A | 6/1992 | Arundale | |
| 5,388,395 A * | 2/1995 | Scharpf et al. | 60/781 |
| 5,464,606 A | 11/1995 | Buswell et al. | |
| 5,733,941 A | 3/1998 | Waycuilis | |
| 6,090,356 A | 7/2000 | Jahnke et al. | |
| 6,375,924 B1 | 4/2002 | Towler et al. | |

(Continued)

FOREIGN PATENT DOCUMENTS

| | | |
|---|---|---|
| CN | 1045156 A | 9/1990 |
| CN | 1209112 A | 2/1999 |

(Continued)

OTHER PUBLICATIONS

International Search Report, PCT/US2008/083781, dated May 15, 2009, pp. 3.

(Continued)

*Primary Examiner* — Phutthiwat Wongwian
*Assistant Examiner* — Steven Sutherland
(74) *Attorney, Agent, or Firm* — Armstrong Teasdale LLP (57) ABSTRACT

A method of producing substitute natural gas (SNG) includes providing at least one steam turbine engine. The method also includes providing a gasification system that includes at least one gas shift reactor configured to receive a boiler feedwater stream and a synthesis gas (syngas) stream. The at least one gas shift reactor is further configured to produce a high pressure steam stream. The method further includes producing a steam stream within the at least one gas shift reactor and channeling at least a portion of the steam stream to the at least one steam turbine engine.

18 Claims, 2 Drawing Sheets

(56) References Cited

U.S. PATENT DOCUMENTS

| | | | |
|---|---|---|---|
| 6,505,467 B1 | 1/2003 | Fjellhaug et al. | |
| 6,548,029 B1 | 4/2003 | Towler et al. | |
| 6,596,780 B2 * | 7/2003 | Jahnke et al. | 518/700 |
| 6,632,846 B2 * | 10/2003 | Sheppard et al. | 518/715 |
| 6,805,721 B2 | 10/2004 | Burch et al. | |
| 6,877,322 B2 | 4/2005 | Fan | |
| 6,991,769 B2 | 1/2006 | Kaneko et al. | |
| 7,074,373 B1 | 7/2006 | Warren et al. | |
| 7,083,658 B2 | 8/2006 | Andrus, Jr. et al. | |
| 7,266,940 B2 * | 9/2007 | Balan et al. | 60/39.181 |
| 7,300,642 B1 | 11/2007 | Pedersen et al. | |
| 2003/0167692 A1 | 9/2003 | Jewell et al. | |
| 2004/0020124 A1 | 2/2004 | Russell et al. | |
| 2004/0047799 A1 | 3/2004 | Randhava et al. | |
| 2004/0131912 A1 * | 7/2004 | Keefer et al. | 429/34 |
| 2005/0056021 A1 * | 3/2005 | Belokon et al. | 60/772 |
| 2005/0106429 A1 | 5/2005 | Keefer | |
| 2006/0149423 A1 | 7/2006 | Barnicki et al. | |
| 2006/0207177 A1 | 9/2006 | Andrus, Jr. et al. | |
| 2008/0056979 A1 | 3/2008 | Arvidson et al. | |
| 2008/0073445 A1 | 3/2008 | Yu et al. | |
| 2008/0279763 A1 | 11/2008 | Snyder et al. | |
| 2009/0320368 A1 | 12/2009 | Castaldi et al. | |

FOREIGN PATENT DOCUMENTS

| | | |
|---|---|---|
| CN | 1241163 A | 1/2000 |
| CN | 1301327 A | 6/2001 |
| CN | 1903996 A | 1/2007 |
| CN | 101016491 A | 8/2007 |
| CN | 101070490 A | 11/2007 |
| JP | 8311570 A | 11/1996 |
| JP | 11080760 | 3/1999 |
| JP | 2006299675 | 11/2006 |
| KR | 1019950019077 | 7/1995 |

OTHER PUBLICATIONS

Texas Syngas, A Commercial Alternative for Traditional Fossil Fuels using Next Generation Gasification Technology, dated Nov. 14, 2006, pp. 15.

Hanstock, David, Gasification Projects and Carbon Dioxide Capture, European Carbon Dioxide Network, dated Apr. 2004, pp. 21.

Eliasson, et al., Greenhouse Gas Control Technologies, dated Aug. 30-Sep. 2, 1998, pp. 7.

International Search Report, PCT/US2008/083788, dated Mar. 27, 2009, pp. 3.

CN Office Action for CN Application No. 2008801246586, Jul. 10, 2012, corresponding to U.S. Appl. No. 11/970,217.

CN Search Report for CN Application No. 200880124658.6, corresponding to U.S. Appl. No. 11/970,217.

CN Office Action dated Aug. 31, 2012 from corresponding CN Application No. 200880124661.8, along with unofficial English translation.

* cited by examiner

METHOD AND APPARATUS TO FACILITATE SUBSTITUTE NATURAL GAS PRODUCTION

BACKGROUND OF THE INVENTION

The present invention relates generally to integrated gasification combined-cycle (IGCC) power generation plants, and more particularly, to methods and apparatus for optimizing substitute natural gas production and heat transfer with a gasification system.

At least some known IGCC plants include a gasification system that is integrated with at least one power-producing turbine system. For example, known gasification systems convert a mixture of fuel, air or oxygen, steam, and/or carbon dioxide ($CO_2$) into a synthesis gas, or "syngas". The syngas is channeled to the combustor of a gas turbine engine, which powers a generator that supplies electrical power to a power grid. Exhaust from at least some known gas turbine engines is supplied to a heat recovery steam generator (HRSG) that generates steam for driving a steam turbine. Power generated by the steam turbine also drives an electrical generator that provides electrical power to the power grid.

At least some known gasification systems associated with IGCC plants include a gasification reactor that produces a syngas that includes at least some carbon monoxide (CO), water vapor ($H_2O$) and particulate matter. The syngas from the gasification reactor is channeled to a scrubbing and quenching assembly that typically removes a substantial portion of the particulate matter and cools the syngas by injecting water into the syngas. Subsequently, in order to increase the amount of combustibles within the syngas, the scrubbed and quenched syngas is typically channeled to at least one water-gas shift reactor to convert the CO and water into hydrogen ($H_2$) and carbon dioxide ($CO_2$) via at least one exothermic chemical reaction. The heat released via the exothermic reactions facilitates a temperature rise in the shift reactor.

At high temperatures and low water content, the CO may react with the $H_2$ to produce methane ($CH_4$) and $CO_2$ via an exothermic chemical reaction. At temperatures in excess of approximately 650 degrees Celsius (° C.) (1200 degrees Fahrenheit (° F.)), the rate of $CH_4$ and $CO_2$ production reactions may accelerate such that control of the heat release within the shift reactor is reduced. Therefore, steam is often injected to mitigate the temperature rise and facilitate control of the temperature within the shift reactor. The amount of steam used typically amounts to approximately 30% to 50% of the high pressure steam that could otherwise be channeled to the steam turbine, thereby reducing the plant's electrical generation. Moreover, such steam injection requires a larger shift reactor to produce an adequate supply of shifted syngas. Furthermore, the increased moisture content of the syngas channeled from the shift reactor forms a need for additional moisture removal apparatus.

BRIEF DESCRIPTION OF THE INVENTION

In one aspect, a method of producing substitute natural gas (SNG) is provided. The method includes providing at least one steam turbine engine and at least one gas shift reactor. The method also includes producing a steam stream within the at least one gas shift reactor. The method further includes channeling at least a portion of the steam stream to the at least one steam turbine engine.

In another aspect, a gasification system is provided. The gasification system includes at least one gas shift reactor configured to receive a boiler feedwater stream and a synthesis gas (syngas) stream. The at least one gas shift reactor is further configured to produce a high pressure steam stream.

In a further aspect, an integrated gasification combined-cycle (IGCC) power generation plant is provided. The IGCC plant includes at least one gasification reactor configured to generate a synthesis gas (syngas) stream. The IGCC plant also includes at least one gas shift reactor coupled in flow communication with the at least one gasification reactor. The at least one gas shift reactor is configured to receive a boiler feedwater stream and at least a portion of the syngas stream. The at least one gas shift reactor is further configured to produce a high pressure steam stream. The IGCC plant further includes at least one steam turbine engine coupled in flow communication with the at least one gas shift reactor. The at least one steam turbine engine is configured to receive at least a portion of the high pressure steam stream.

DETAILED DESCRIPTION OF THE INVENTION

Figure 1:
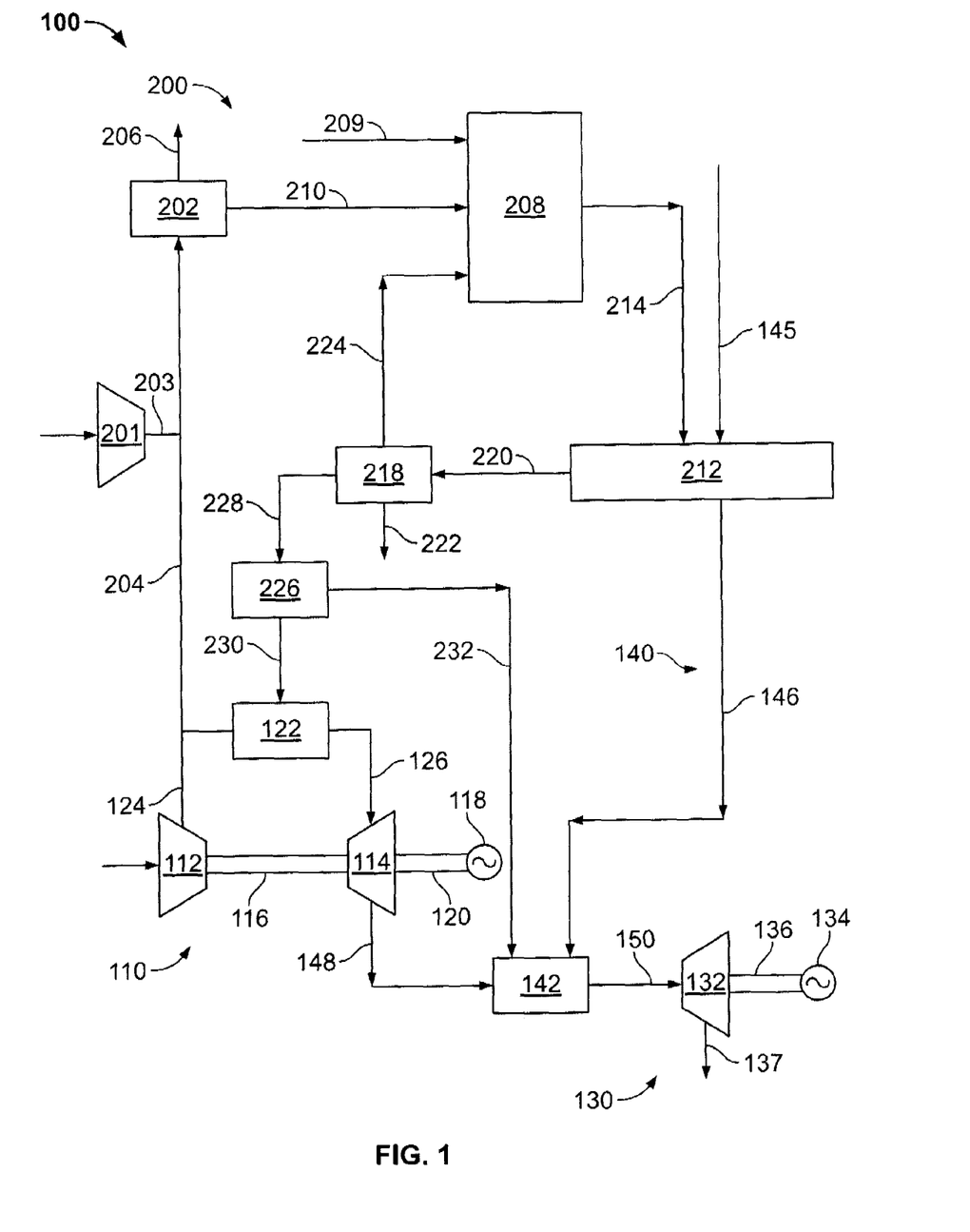
FIG. 1 is a schematic diagram of an exemplary integrated gasification combined-cycle (IGCC) power generation plant.

FIG. 1 is a schematic diagram of an exemplary integrated gasification combined-cycle (IGCC) power generation plant 100. In the exemplary embodiment, IGCC plant includes a gas turbine engine 110. Engine 110 includes a compressor 112 that is rotatably coupled to a turbine 114 via a shaft 116. Compressor 112 receives air at locally atmospheric pressures and temperatures. Turbine 114 is rotatably coupled to a first electrical generator 118 via a first rotor 120. In the exemplary embodiment, engine 110 also includes at least one combustor 122 coupled in flow communication with compressor 112. Combustor 122 receives at least a portion of air (not shown) compressed by compressor 112 via an air conduit 124. Combustor 122 is also coupled in flow communication with at least one fuel source (described in more detail below) and receives fuel from the fuel source. The air and fuel are mixed and combusted within combustor 122 and combustor 122 produces hot combustion gases (not shown). Turbine 114 is coupled in flow communication with combustor 122 and turbine 114 receives the hot combustion gases via a combustion gas conduit 126. Turbine 114 converts the heat energy within the gases to rotational energy. The rotational energy is transmitted to generator 118 via rotor 120, wherein generator 118 converts the rotational energy to electrical energy (not shown) for transmission to at least one load, including, but not limited to, an electrical power grid (not shown).

In the exemplary embodiment, IGCC plant 100 also includes a steam turbine engine 130. More specifically, in the exemplary embodiment, engine 130 includes a steam turbine 132 rotatably coupled to a second electrical generator 134 via a second rotor 136.

IGCC plant 100 also includes a steam generation system 140. In the exemplary embodiment, system 140 includes at least one heat recovery steam generator (HRSG) 142 that is coupled in flow communication with at least one water-gas shift reactor 212 (discussed further below) via at least one boiler feedwater conduit 146. Reactor 212 receives boiler feedwater from a conduit 145. HRSG 142 is also coupled in flow communication with turbine 114 via at least one conduit 148. HRSG 142 receives boiler feedwater (not shown) from reactor 212 via conduit 146 for facilitating heating the boiler feedwater into steam. HRSG 142 also receives exhaust gases (not shown) from turbine 114 via exhaust gas conduit 148 to further facilitate heating the boiler feedwater into steam. HRSG 142 is coupled in flow communication with turbine 132 via a steam conduit 150.

Conduit 150 channels steam (not shown) from HRSG 142 to turbine 132. Turbine 132 receives the steam from HRSG 142 and converts the thermal energy in the steam to rotational energy. The rotational energy is transmitted to generator 134 via rotor 136, wherein generator 134 converts the rotational energy to electrical energy (not shown) for transmission to at least one load, including, but not limited to, the electrical power grid. The steam is condensed and returned as boiler feedwater via a condensate conduit 137.

IGCC plant 100 also includes a gasification system 200. In the exemplary embodiment, system 200 includes at least one air separation unit 202 that is coupled in flow communication with compressor 112 via an air conduit 204. Air separation unit is also coupled in flow communication with at least one compressor 201 via an air conduit 203 wherein compressor 201 supplements compressor 112. Alternatively, air separation unit 202 is coupled in flow communication to other air sources that include, but are not limited to, dedicated air compressors and compressed air storage units (neither shown). Unit 202 separates air into oxygen ($O_2$) and other constituents (neither shown) that, in the exemplary embodiment, are released via vent 206.

System 200 includes a gasification reactor 208 that is coupled in flow communication with unit 202 to receive $O_2$ channeled from unit 202 via a conduit 210. Reactor 208 also receives coal 209 to produce a sour synthesis gas (syngas) stream (not shown).

System 200 also includes a water-gas shift reactor 212 that is coupled in flow communication with reactor 208 and receives the sour syngas stream from gasification reactor 208 via a conduit 214. Shift reactor 212 produces a shifted sour syngas stream (not shown) that includes carbon dioxide ($CO_2$) and hydrogen ($H_2$) at increased concentrations as compared to the sour syngas stream produced in reactor 208. Reactor 212 is coupled in heat transfer communication with steam generation system 140 via conduits 145 and 146 wherein heat generated within reactor 212 is removed by system 140.

System 200 further includes an acid gas removal unit (AGRU) 218 that is coupled in flow communication with reactor 212 and that receives the shifted sour syngas stream from reactor 212 via a conduit 220. AGRU 218 facilitates removal of at least a portion of acid components (not shown) from the sour shifted syngas stream via a conduit 222. AGRU 218 facilitates removal of at least a portion of the $CO_2$ contained in the sour shifted syngas stream, and produces a sweetened syngas stream (not shown) from at least a portion of the sour syngas stream. AGRU 218 is coupled in flow communication with reactor 208 via a $CO_2$ conduit 224 wherein a stream of $CO_2$ (not shown) is channeled to predetermined portions of reactor 208 (discussed further below).

System 200 also includes a methanation reactor 226 that is coupled in flow communication with AGRU 218 receives the sweetened syngas stream from AGRU 218 via a conduit 228. Reactor 226 produces a substitute natural gas (SNG) stream (not shown) from at least a portion of the sweetened syngas stream. Reactor 226 is also coupled in flow communication with combustor 122 wherein the SNG stream is channeled to combustor 122 via a SNG conduit 230. Moreover, reactor 226 is coupled in heat transfer communication with HRSG 142 via a heat transfer conduit 232. Such heat transfer communication facilitates transfer of heat to HRSG 142 that is generated by the sweetened syngas-to-SNG conversion process performed within reactor 226.

In operation, compressor 201 receives atmospheric air, compresses the air, and channels the compressed air to air separation unit 202 via conduits 203 and 204. Unit 202 may also receive air from compressor 112 via conduits 124 and 204. The compressed air is separated into $O_2$ and other constituents that are vented via vent 206. The $O_2$ is channeled to gasification reactor 208 via conduit 210. Reactor 208 receives the $O_2$ via conduit 210, coal 209, and $CO_2$ from AGRU 218 via conduit 224. Reactor 208 produces a sour syngas stream that is channeled to gas shift reactor 212 via conduit 214. The sour syngas stream is used to produce the shifted sour syngas stream via exothermic chemical reactions. The shifted syngas stream includes $CO_2$ and $H_2$ at increased concentrations, as compared to the sour syngas stream produced in reactor 208. The heat from the exothermic reactions is channeled to HRSG 142 via conduit 146.

Moreover, in operation, the shifted syngas stream is channeled to AGRU 218 via conduit 220 wherein acid constituents are removed via conduit 222, and $CO_2$ is channeled to reactor 208 via conduit 224. In this manner, AGRU 218 produces a sweetened syngas stream that is channeled to methanation reactor 226 via channel 228 wherein the SNG stream is produced from the sweetened syngas stream via exothermic chemical reactions. The heat from the reactions is channeled to HRSG 142 via conduit 232 and the SNG stream is channeled to combustor 122 via conduit 230.

Further, in operation, turbine 114 rotates compressor 112 such that compressor 112 receives and compresses atmospheric air, and channels a portion of the compressed air to unit 202 and a portion to combustor 122. Combustor 122 mixes and combusts the air and SNG, and channels the hot combustion gases to turbine 114. The hot gases induce rotation of turbine 114 which subsequently rotates generator 118 via rotor 120, as well as compressor 112.

At least a portion of the combustion gases are channeled from turbine 114 to HRSG 142 via conduit 148. Also, at least a portion of the heat generated in reactor 226 is channeled to HRSG 142 via conduit 232. Moreover, at least a portion of the heat produced in reactor 212 is channeled to HRSG 142. Sub-cooled boiler feedwater is channeled to reactor 212 via conduit 145 at a predetermined pressure. The water within reactor 212 receives at least a portion of the heat generated within reactor 212 such that the water temperature is raised to approximately saturation temperatures associated with the predetermined pressure. The saturated fluid is channeled to HRSG 142 via conduit 146 wherein the heat from reactor 226 and exhaust gas conduit 148 further adds heat to the fluid to form a high pressure steam stream (not shown). The steam stream is channeled to steam turbine 132 and induces rotation of turbine 132. Turbine 132 rotates second generator 134 via second rotor 136. The steam condensed by turbine 132 is recycled for further use via conduit 137.

Figure 2:
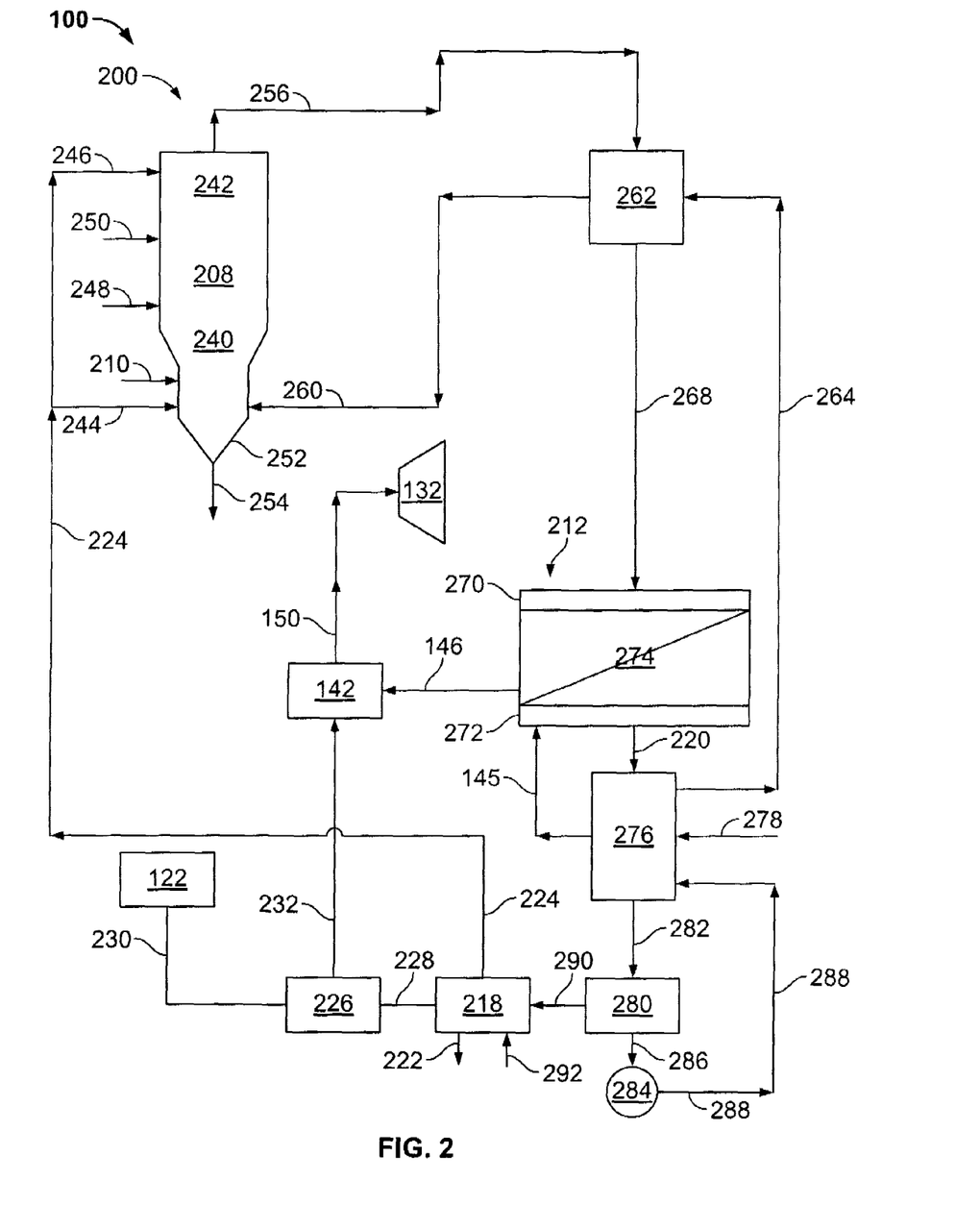
FIG. 2 is a schematic diagram of an exemplary gasification system that can be used with the IGCC power generation plant shown in FIG. 1.

FIG. 2 is a schematic diagram of exemplary gasification system 200 that can be used with IGCC power generation plant 100. System 200 includes gasification reactor 208. Reactor 208 includes a lower stage 240 and an upper stage 242. In the exemplary embodiment, lower stage 240 receives $O_2$ via conduit 210 such that lower stage 240 is coupled in flow communication with air separation unit 202 (shown in FIG. 1).

Conduit 224 is coupled in flow communication with a lower stage $CO_2$ conduit 244 and an upper stage $CO_2$ conduit 246. As such, lower stage 240 and upper stage 242 are coupled in flow communication to AGRU 218. Moreover, lower stage 240 and upper stage 242 receive dry coal via a lower coal conduit 248 and an upper coal conduit 250, respectively.

Lower stage 240 includes a lock hopper 252 that temporarily stores liquid slag received from lower stage 240. In the exemplary embodiment, hopper 252 is filled with water. Alternatively, hopper 252 has any configuration that facilitates operation of system 200 as described herein. The slag is removed via a conduit 254. Upper stage 242 facilitates removal of a char-laden, sour, hot syngas stream (not shown) via a removal conduit 256. Conduit 256 couples gasification reactor 208 in flow communication with a scrubbing and quenching unit 262.

Scrubbing and quenching unit 262 separates sour, hot syngas from the char, such that the char may be recycled back to lower stage 240 via a return conduit 260. Unit 262 includes a quenching assembly (not shown) that adds and mixes water with the sour, hot syngas stream channeled to unit 262 via conduit 256 to facilitate cooling of the hot syngas stream, such that a sour, quenched syngas stream (not shown) is formed. Unit 262 is configured to receive water via a conduit 264. Unit 262 also facilitates agglomeration of the char that further facilitates char removal. Unit 262 includes a separator assembly (not shown) that facilitates char removal and other particulates removal from the syngas stream. Unit 262 is coupled in flow communication with gas shift reactor 212 via conduit 268.

Reactor 212 includes an inlet plenum 270, an outlet plenum 272 and a catalyst section 274. Inlet plenum 270 is coupled in flow communication with unit 262 via conduit 268 and with catalyst section 274. Moreover, inlet plenum 270 receives the syngas stream from conduit 268 and provides a predetermined distribution of the syngas to catalyst section 274. Section 274 includes a catalyst assembly (not shown) wherein a predetermined catalyst is contained in a manner that facilitates a substantially static distribution of the catalyst within the assembly. The catalyst assembly is coupled in flow communication with plenums 270 and 272. Moreover, the catalyst assembly is configured to receive the syngas with a predetermined distribution from plenum 270 and the catalyst (not shown) facilitates production of $H_2$ and $CO_2$ from the CO and water within the syngas stream channeled via conduit 268. The production of $H_2$ and $CO_2$ is performed by exothermic chemical reactions and forms a shifted syngas stream (not shown). Outlet plenum 272 is coupled in flow communication with the catalyst assembly and a heat transfer apparatus 276. Plenum 272 receives the shifted syngas from the catalyst assembly and mixes the shifted syngas for channeling to apparatus 276 via conduit 220. Therefore, gas shift reactor 212 produces a shifted sour syngas stream (not shown) that includes $CO_2$ and $H_2$ at increased concentrations as compared to the sour syngas stream produced in reactor 208.

Reactor 212 also includes a heat transfer portion (not shown) of section 274 that surrounds at least a portion of the catalyst assembly wherein section 274 receives sub-cooled boiler feedwater (not shown) from heat transfer apparatus 276 via conduit 145. The heat transfer portion is configured to facilitate direct contact between the catalyst portion of section 274 and the boiler feedwater such that removal of the heat generated by the exothermic chemical reactions within the catalyst assembly is facilitated. In the exemplary embodiment, the heat transfer portion is coupled in flow communication with HRSG 142 via conduit 146. Alternatively, reactor 212 is coupled in flow communication with reactor 226 via at least a portion of conduit 146. In the exemplary embodiment, reactor 212 is configured in a manner similar to a shell and tube heat exchanger wherein the catalyst assembly is a plurality of tubes (not shown) wherein the catalyst is at least partially housed in the tubes. Moreover, in the exemplary embodiment, the catalyst assembly is positioned in a cavity (not shown) within section 274. Furthermore, in the exemplary embodiment, the syngas flows through the catalyst within section 274 in the tubes and the boiler feedwater flows around the outside of the tubes. Alternatively, reactor 212 is configured in any manner that facilitates operation of system 200 as described herein.

Alternatively, reactor 212 is configured in any manner that facilitates operation of system 200 as described herein. For example, optimized control of a reactor temperature profile can be accomplished by, but not being limited to, specifically designing tubes (not shown) with external and/or internal fins/baffles (not shown) so that heat transfer rates are further facilitated and a predetermined amount of heat is removed as the gas flows through the tubes.

Heat transfer apparatus 276 is coupled in flow communication with shift reactor 212 via conduit 220 and receives the shifted sour syngas stream from reactor 212. In the exemplary embodiment, apparatus 276 is a shell and tube heat exchanger. Alternatively, apparatus 276 has any configuration that facilitates operation of system 200 as described herein. Apparatus 276 is also coupled in flow communication with a boiler feedwater source (not shown) via a conduit 278 and with reactor 212 via conduit 145 such that boiler feedwater flow through apparatus 276 to reactor 212 is facilitated. Moreover, apparatus 276 is coupled in flow communication with a trim cooler 280 via a conduit 282. Trim cooler 280 receives the shifted sour syngas stream from apparatus 276 via conduit 282. Cooler 280 cools the syngas stream channeled from apparatus 276 and removes a significant portion of the remaining latent heat of vaporization such that any steam within the syngas stream is condensed. Cooler 280 is coupled in flow communication with a knockout drum 284 via a conduit 286. Knockout drum 284 is also coupled in flow communication with apparatus 276 via a conduit 288.

AGRU 218 is coupled in flow communication with trim cooler 280 via a conduit 290 and receives the shifted sour syngas stream with the increased $CO_2$ and $H_2$ concentrations. AGRU 218 also facilitates removal of at least a portion of acid components (not shown) that include, but are not limited to, sulfuric and carbonic acids, from the sour shifted syngas stream via conduit 222. To further facilitate acid removal, AGRU 218 receives a solvent that includes, but is not limited to, amine, methanol, and/or Selexol® via a conduit 292. Such acid removal thereby facilitates producing a sweetened syngas stream (not shown) from the sour syngas stream. AGRU 218 also facilitates removal of at least a portion of the gaseous $CO_2$ contained in the sour shifted syngas stream. Moreover, AGRU 218 is coupled in flow communication with reactor 208 via conduit 224 such that a stream of $CO_2$ (not shown) is channeled to reactor 208 lower stage 240 and upper stages 242 via conduits 244 and 246, respectively.

Methanation reactor 226 is coupled in flow communication with AGRU 218 and receives the sweetened syngas stream from AGRU 218 via conduit 228. Reactor 226 produces a substitute natural gas (SNG) stream (not shown) from at least a portion of the sweetened syngas stream. Reactor 226 is also coupled in flow communication with combustor 122 such that the SNG stream is channeled to combustor 122 via conduit 230. Moreover, reactor 226 is coupled in heat transfer communication with HRSG 142 via conduit 232 to facilitate a transfer of heat to HRSG 142 that is generated by the sweetened syngas-to-SNG conversion process performed within reactor 226. In an alternative embodiment, reactor 226 is configured to receive at least a portion of the boiler feedwater from reactor 212 via at least a portion of conduit 146.

An exemplary method of producing substitute natural gas (SNG) is provided. The method includes providing at least one steam turbine engine 130 and at least one gas shift reactor 212. The method also includes producing a steam stream within at least one gas shift reactor 212. The method further includes channeling at least a portion of the steam stream to at least one steam turbine engine 130.

During operation, $O_2$ from separator unit 202 and preheated coal are introduced into lower stage 240 via conduits 210 and 248, respectively. The coal and the $O_2$ are reacted with preheated char introduced into lower stage 240 via conduit 260 to produce a syngas containing primarily $H_2$, CO, $CO_2$, and at least some hydrogen sulfide ($H_2S$). Such syngas formation is via chemical reactions that are substantially exothermic in nature and the associated heat release generates operational temperatures within a range of approximately 1371 degrees Celsius (° C.) (2500 degrees Fahrenheit (° F.)) to approximately 1649° C. (3000° F.). At least some of the chemical reactions that form syngas also form a slag (not shown). The high temperatures within lower stage 240 facilitate maintaining a low viscosity for the slag such that substantially most of the liquid slag can be gravity fed into hopper 252 wherein the relatively cool water in hopper 252, facilitates rapid quenching and breaking of the slag. The syngas flows upward through reactor 208 wherein, through additional reactions in upper stage 242, some of the slag is entrained. In the exemplary embodiment, the coal introduced into lower stage 240 is a dry, or low-moisture, coal that is pulverized to a sufficient particle size to permit entrainment of the pulverized coal with the synthesis gas flowing from lower stage 240 to upper stage 242.

In the exemplary embodiment, $CO_2$ from AGRU 218 is introduced into lower stage 240 via conduits 224 and 244. The additional $CO_2$ facilitates increasing an efficiency of IGCC plant 100 by decreasing the required mass flow rate of $O_2$ introduced via conduit 210. The $O_2$ molecules from conduit 210 are supplanted with $O_2$ molecules formed by the dissociation of $CO_2$ molecules into their constituent carbon (C) and $O_2$ molecules. As such, additional air for combustion within turbine engine combustor 122 is available for a predetermined compressor rating, thereby facilitating gas turbine engine 110 operating at or beyond rated power generation.

The chemical reactions conducted in upper stage 242 are conducted at a temperature in a range of approximately 816° C. (1500° F.) to approximately 982° C. (1800° F.) and at a pressure in excess of approximately 30 bars, or 3000 kiloPascal (kPa) (435 pounds per square inch (psi)) with a sufficient residence time that facilitates the reactants in upper stage 242 reacting with the coal. Moreover, additional dry, preheated coal and $CO_2$ are introduced into upper stage 242 via conduits 250 and 246, respectively. The syngas and other constituents that rise from lower stage 240, and the additional coal and $CO_2$ are mixed together to form exothermic chemical reactions that also form steam, char, methane ($CH_4$), and other gaseous hydrocarbons (including C2+, or, hydrocarbon molecules with at least two carbon atoms). The C2+ hydrocarbon molecules and a portion of the $CH_4$ reacts with the steam and $CO_2$ to form a hot, char-laden syngas stream. The temperature range of upper stage 242 is predetermined to facilitate formation of $CH_4$ and mitigate formation of C2+ hydrocarbon molecules.

At least one product of the chemical reactions within upper stage 242, i.e., between the preheated coal and the syngas, is a low-sulfur char that is entrained in the hot, sour syngas containing $CH_4$, $H_2$, CO, $CO_2$, and at least some $H_2S$. The sulfur content of the char is maintained at a minimum level by reacting the pulverized coal with the syngas in the presence of $H_2$ and steam at elevated temperatures and pressures.

The low-sulfur char and liquid slag that are entrained in the hot, sour synthesis gas stream are withdrawn from upper stage 242 and is channeled through conduit 256 into scrubbing and quenching unit 262. A substantial portion of the char and slag are separated from the hot, sour syngas stream in unit 262 and are withdrawn therefrom. The char and slag are channeled through conduit 260 into lower stage 240 for use as a reactant and for disposal, respectively.

Unit 262 also facilitates cooling of the syngas stream. Water is injected into the syngas stream via conduit 264 and is vaporized wherein the heat energy associated with the water's latent heat of vaporization is removed from the hot, sour syngas stream and the syngas stream temperature is decreased to approximately 900° C. (1652° F.). The steam entrained within the hot, sour syngas stream is used in subsequent gas shift reactions (described below) with a steam-to-dry gas ratio of approximately 0.8-0.9.

The hot, sour, steam-laden syngas stream is channeled from unit 262 to gas shift reactor 212 via conduit 268. The syngas enters plenum 270 wherein it is distributed to the catalyst apparatus within section 274 with a predetermined distribution pattern. The syngas flows through the catalyst within the catalyst apparatus. Reactor 212 facilitates formation of $CO_2$ and $H_2$ from the CO and $H_2O$ (in the form of steam) within the syngas stream via an exothermic chemical reaction:

$$CO + H_2O \leftrightarrow CO_2 + H_2 \qquad (1)$$

The heat from the exothermic reactions is transferred from the hot, syngas stream into boiler feedwater via the heat transfer portion of section 274. Therefore, the hot, sour syngas stream that is channeled into reactor 212 is cooled to a predetermined temperature and is shifted to a cooled, sour syngas stream with an increased concentration of $CO_2$ and $H_2$ with a steam-to-dry gas molar ratio of less than approximately 0.2-0.5, and with a steam-to-CO molar ratio of at less than approximately 2.2. Therefore, the syngas stream is channeled into outlet plenum 272 from section 274 and exits reactor 212 with a lower water content that that typically found in some known water-gas shift reactors. Moreover, since some known water-gas shift reactors require steam addition for temperature control, the catalyst apparatus of reactor 212 can be configured to be approximately 35% smaller than similar catalyst apparatus in such known reactors. Furthermore, since shift reactor 212 does not use steam produced by HRSG 142, more steam is available for turbine 132.

The shifted, cooled, sour syngas stream is channeled from reactor 212 to heat transfer apparatus 276 via conduit 220. Additional heat in the syngas stream is removed by boiler feedwater from a boiler feedwater source and condensate from knockout drum 284 via conduit 288.

The further cooled, sour, shifted syngas stream is channeled from apparatus 276 to trim cooler 280 via conduit 282. Trim cooler 280 facilitates removing at least some of the remaining latent heat of vaporization from the syngas stream such that a substantial portion of the remaining $H_2O$ is condensed and removed from the syngas stream via knockout drum 284. A condensate stream (not shown) is channeled from drum 284 to apparatus 276 via conduit 288.

The cool, sour, shifted syngas stream is channeled from trim cooler 280 to AGRU 218 via conduit 290. AGRU 218 primarily facilitates removing $H_2S$ and $CO_2$ from the syngas stream channeled from reactor 212. The $H_2S$ mixed with the syngas stream contacts a selective solvent within AGRU 218.

In the exemplary embodiment, the solvent used in AGRU 218 is an amine. Alternatively, the solvent includes, but is not limited to including, methanol, and/or Selexol®. The solvent is channeled to AGRU 218 via solvent conduit 292. A concentrated $H_2S$ stream is withdrawn from the bottom of AGRU 218 via conduit 222 to a recovery unit (not shown) associated with further recovery processes. In addition, $CO_2$ in the form of carbonic acid is also removed and disposed of in a similar manner. Moreover, gaseous $CO_2$ is collected within AGRU 218 and is channeled to reactor 208 via conduit 224.

The sweetened syngas stream is channeled from AGRU 218 to methanation reactor 226 via conduit 228. The sweetened syngas stream is substantially free of $H_2S$ and $CO_2$ and includes proportionally increased concentrations of $CH_4$ and $H_2$. The syngas stream also includes a stoichiometric amount of $H_2$ necessary to completely convert the CO to $CH_4$ that is at least 3:1 with respect to the $H_2$/CO ratio. In the exemplary embodiment, reactor 226 uses at least one catalyst known in the art to facilitate an exothermic chemical reaction such as:

$$CO + 3H_2 \leftrightarrow CH_4 + H_2O. \qquad (2)$$

The $H_2$ in reactor 226 converts at least approximately 95% of the remaining CO to $CH_4$ such that a SNG stream is channeled to combustor 122 via conduit 230 containing over 90% $CH_4$ and less than 0.1% CO by volume.

The SNG produced as described herein facilitates the use of dry low $NO_x$ combustors within gas turbine 110 while reducing a need for diluents. Moreover, such SNG production facilitates using existing gas turbine models with little modification to affect efficient combustion. Furthermore, such SNG increases a safety margin in comparison to fuels having higher $H_2$ concentrations.

The heat generated in the exothermic chemical reactions within reactor 226 is transferred to HRSG 142 via conduit 232 to facilitate boiling of the feedwater that is channeled to HRSG 142 via conduit 146. The steam being generated is channeled to turbine 132 via conduit 150. Such heat generation has the benefit of improving the overall efficiency of IGCC plant 100. Moreover, the increased temperature of the SNG facilitates an improved efficiency of combustion within combustor 122. In the exemplary embodiment, reactor 226, and conduit 232 are configured within HRSG 142 as a shell and tube heat exchanger. Alternatively, conduit 232, reactor 226, and HRSG 142 have any configuration that facilitates operation of IGCC plant 100 as described herein.

In the exemplary embodiment, increasing a thermal efficiency of IGCC plant 100 is facilitated. High pressure boiler feedwater is channeled to heat transfer apparatus 276 at a predetermined pressure wherein heat is transferred from the syngas stream to the boiler feedwater. A sub-cooled boiler feedwater stream is channeled to shift reactor 212 via conduit 145. The temperature of the sub-cooled boiler feedwater is increased within reactor 212 to a temperature that is substantially saturated for the existing boiler feedwater pressure. A saturated high pressure boiler feedwater steam stream is channeled from reactor 212 to HRSG 142 wherein the saturated boiler feedwater is heated to produce at least a portion of a high pressure, superheated steam stream that is channeled to turbine 132 via conduit 150. Alternatively, the saturated high pressure boiler feedwater steam stream is channeled from reactor 212 to reactor 226 wherein the saturated boiler feedwater is heated to produce a high pressure, superheated steam stream that is channeled to either turbine 132 directly or via HRSG 142 and conduit 150.

Increasing the thermal efficiency by the exemplary methods discussed above facilitates decreasing capital equipment and construction costs by eliminating heat transfer apparatus and associated piping and pumps that are typically used downstream of reactor 212. The reduced hardware requirements is facilitated because eliminating the need for channeling steam from HRSG 142 to reactor 212 for temperature control reduces the overall duty of the heat recovery components by approximately 50% with approximately 35% less heat recovery component flow and 75% less condensate than some typical known gasification systems.

Moreover, in the exemplary embodiment, increasing a thermal efficiency of IGCC plant 100 is further facilitated. Condensate removed from the syngas stream via trim cooler 280 is channeled to knockout drum 284. From drum 284, the condensate is channeled to heat transfer apparatus 276 via conduit 288. The condensate receives heat from the syngas stream within apparatus 276 after the heat transfer actions of the syngas stream and the boiler feedwater. The heated condensate is channeled to scrubbing and quenching unit 262 via conduit 264. The heated condensate being used to remove the solid materials from the syngas stream channeled from reactor 208 mitigates the heat removal from the syngas stream during the scrubbing and quenching actions. Therefore, the remaining heat within the syngas stream channeled to reactor 212 and apparatus 276 is used to heat the boiler feedwater, thereby facilitating the production of the superheated high pressure steam stream in HRSG 142.

The method and apparatus for substitute natural gas, or SNG, production as described herein facilitates operation of integrated gasification combined-cycle (IGCC) power generation plants, and specifically, SNG production systems. Specifically, configuring the IGCC and SNG production systems as described herein facilitates optimally generating and collecting heat from the exothermic chemical reactions in the SNG production process to facilitate improving IGCC plant thermal efficiency. More specifically, channeling warm boiler feedwater through a water-gas shift reactor provides an effective method of controlling the shift reactor's temperature. Moreover, such configuration facilitates forming a superheated, high pressure steam stream for power generation. Furthermore, such configuration facilitates reducing capital and labor costs associated with constructing IGCC and SNG production systems by eliminating heat transfer apparatus and associated piping and pumps that are typically used downstream of such water-gas shift reactor.

Exemplary embodiments of SNG production as associated with IGCC plants are described above in detail. The methods, apparatus and systems are not limited to the specific embodiments described herein nor to the specific illustrated IGCC plants.

While the invention has been described in terms of various specific embodiments, those skilled in the art will recognize that the invention can be practiced with modification within the spirit and scope of the claims.

What is claimed is:

1. A method of producing substitute natural gas (SNG), said method comprising:
providing at least one gasification reactor configured to generate a hot synthesis gas (syngas) stream;
providing at least one syngas quenching assembly coupled in flow communication with the at least one gasification reactor;
coupling at least one gas shift reactor in flow communication with the at least one syngas quenching assembly to facilitate increasing a concentration of hydrogen ($H_2$) syngas stream;
coupling at least one heat transfer apparatus downstream from the at least one gas shift reactor, such that the at least one gas shift reactor receives cooled boiler feedwater from the at least one heat transfer apparatus for use in cooling the at least one gas shift reactor;

channeling a quenched syngas stream from the at least one syngas quenching assembly to the at least one gas shift reactor;

coupling at least one acid gas removal unit in flow communication with the at least one gas shift reactor;

coupling at least one heat recovery steam generator (HRSG) in flow communication with the at least one gas shift reactor, and coupling at least one methanation reactor in flow communication with the at least one acid gas removal unit (AGRU) and with the at least one heat recovery steam generator (HRSG), wherein the at least one heat recovery steam generator (HRSG) receives heat generated by the at least one methanation reactor.

2. A method in accordance with claim 1 further comprising:

producing a shifted syngas stream within the at least one gas shift reactor, the shifted syngas stream having at least one of:
  a steam-to-dry gas molar ratio of less than approximately 0.2-0.5; and
  a steam-to-carbon monoxide molar ratio of less than approximately 2.2;

providing at least one steam turbine engine coupled in flow communication with the at least one HRSG;

producing a saturated steam stream within the at least one gas shift reactor;

channeling at least a portion of the saturated steam stream to the at least one HRSG;

providing a boiler feedwater stream;

channeling at least a portion of the quenched syngas stream and at least a portion of the boiler feedwater stream to the at least one gas shift reactor; and transferring heat from at least a portion of the shifted syngas stream to at least a portion of the boiler feedwater stream.

3. A method in accordance with claim 2 wherein providing a boiler feedwater stream comprises:

channeling at least a portion of a first boiler feedwater stream at predetermined pressure and a predetermined temperature to the at least one heat transfer apparatus;

channeling at least a portion of the shifted syngas stream to the at least one heat transfer apparatus;

transferring heat from at least a portion of the shifted syngas stream to at least a portion of the boiler feedwater stream, thereby forming a second boiler feedwater stream at a second predetermined temperature that is greater than the first predetermined temperature; and channeling at least a portion of the second boiler feedwater stream to the at least one gas shift reactor.

4. A method in accordance with claim 2 wherein transferring heat from at least a portion of the shifted syngas stream comprises transferring heat from at least a portion of the shifted syngas stream to at least a portion of a boiler feedwater stream at a predetermined pressure and a predetermined temperature, thereby forming a second boiler feedwater stream at a second predetermined temperature that is greater than the first predetermined temperature.

5. A method in accordance with claim 4 wherein forming a second boiler feedwater stream comprises forming the second boiler feedwater stream wherein the second predetermined temperature is approximately equal to a saturation temperature for the predetermined pressure.

6. A method in accordance with claim 2 wherein transferring heat from at least a portion of the shifted syngas stream comprises controlling a temperature within at least a portion of the at least one gas shift reactor to approximately a predetermined temperature that has a value that facilitates control of a rate of production reactions of hydrogen and carbon dioxide within the at least one gas shift reactor.

7. A method in accordance with claim 2 wherein channeling at least a portion of the saturated steam stream to the at least one HRSG comprises channeling at least a portion of a boiler feedwater stream at a predetermined pressure and a predetermined temperature that is approximately equal to a saturation temperature for the predetermined pressure to at least one of:

the at least one HRSG coupled upstream from the at least one steam turbine engine, wherein at least a portion of the boiler feedwater stream is at a predetermined temperature that is greater than saturation temperature for the predetermined pressure; and said at least one methanation reactor coupled upstream from the at least one steam turbine engine, wherein at least a portion of the boiler feedwater stream is at a predetermined temperature that is greater than saturation temperature for the predetermined pressure.

8. A method in accordance with claim 2 further comprising:

channeling at least a portion of a first condensate stream at a first predetermined temperature to the at least one heat transfer apparatus;

transferring heat from at least a portion of the shifted syngas stream to at least a portion of the first condensate stream, thereby forming a second condensate stream at a second predetermined temperature that is greater than the first predetermined temperature; and channeling at least a portion of the second condensate stream to the syngas quenching assembly.

9. A gasification system comprising:

at least one gasification reactor configured to generate a hot synthesis gas (syngas) stream;

at least one syngas quenching assembly coupled in flow communication with said at least one gasification reactor; and at least one gas shift reactor coupled in flow communication with said at least one syngas quenching assembly to facilitate increasing a concentration of hydrogen ($H_2$) in the syngas stream, said at least one syngas quenching assembly configured to channel a quenched syngas stream to said at least one gas shift reactor, the quenched syngas stream having a steam-to-dry gas ratio within a range of approximately 0.8 to 0.9;

at least one heat transfer apparatus coupled downstream from said at least one gas shift reactor, such that said at least one gas shift reactor receives sub-cooled boiler feedwater from said at least one heat transfer apparatus for use in cooling said at least one gas shift reactor;

at least one acid gas removal unit coupled in flow communication with said at least one gas shift reactor;

at least one heat recovery steam generator (HRSG) coupled in flow communication with said at least one gas shift reactor; and at least one methanation reactor coupled in flow communication with the at least one acid gas removal unit (AGRU) and with the at least one heat recovery steam generator (HRSG), wherein the at least one heat recovery steam generator (HRSG) receives heat generated by the at least one methanation reactor.

10. A gasification system in accordance with claim 9 wherein said at least one gas shift reactor is configured to:

receive a synthesis gas (syngas) stream;

produce a high pressure steam stream at substantially saturation conditions;

channel the substantially saturated high pressure steam stream to said at least one HRSG; and produce a shifted syngas stream having at least one of:
- a steam-to-dry gas molar ratio of less than approximately 0.2-0.5; and
- a steam-to-carbon monoxide molar ratio of less than approximately 2.2.

11. A gasification system in accordance with claim 10 wherein said at least one gas shift reactor is further configured to capture at least a portion of heat released from at least one exothermic chemical reaction.

12. A gasification system in accordance with claim 10 wherein said at least one heat transfer apparatus is configured to receive at least a portion of the shifted syngas stream and a condensate stream, said at least one heat transfer apparatus is further configured to transfer heat from at least a portion of the shifted syngas stream to at least a portion of the condensate stream.

13. A gasification system in accordance with claim 10 wherein said at least one gas shift reactor is coupled in flow communication with at least one apparatus configured to receive said substantially saturated high pressure steam stream and produce a superheated steam stream, said apparatus is coupled in flow communication with at least one steam turbine engine, said apparatus comprises at least one of:
- said at least one HRSG; and
- said at least one methanation reactor.

14. An integrated gasification combined-cycle (IGCC) power generation plant comprising:
- at least one gasification reactor configured to generate a hot synthesis gas (syngas) stream;
- at least one syngas quenching assembly coupled in flow communication with said at least one gasification reactor;
- at least one gas shift reactor coupled in flow communication with said at least one syngas quenching assembly to facilitate increasing a concentration of hydrogen ($H_2$) in the syngas stream, said at least one syngas quenching assembly configured to channel a quenched syngas stream to said at least one gas shift reactor, the quenched syngas stream having a steam-to-dry gas ratio within a range of approximately 0.8 to 0.9;
- at least one heat transfer apparatus coupled downstream from said at least one gas shift reactor for use in cooling said at least one gas shift reactor;
- at least one acid gas removal unit coupled in flow communication with, the at least one gas shift reactor;
- at least one heat recovery steam generator (HRSG) coupled in flow communication with, the at least one gas shift reactor, and
- at least one methanation reactor coupled in flow communication with the at least one acid gas removal unit (AGRU) and with the at least one heat recovery steam generator (HRSG), wherein the at least one heat recovery steam generator (HRSG) receives heat generated by the at least one methanation reactor.

15. An IGCC power generation plant in accordance with claim 14—wherein said at least one gas shift reactor is configured to:
- receive a synthesis gas (syngas) stream;
- produce a high pressure steam stream at substantially saturation conditions;
- channel the substantially saturated high pressure steam stream to said at least one HRSG; and
- produce a shifted syngas stream having at least one of:
  - a steam-to-dry gas molar ratio of less than approximately 0.2-0.5; and
  - a steam-to-carbon monoxide molar ratio of less than approximately 2.2; and
- at least one steam turbine engine coupled in flow communication with said at least one HRSG, said at least one steam turbine engine configured to receive at least a portion of a superheated high pressure steam stream.

16. An IGCC power generation plant in accordance with claim 15 wherein said at least one gas shift reactor is further configured to capture at least a portion of heat released from at least one exothermic chemical reaction.

17. An IGCC power generation plant in accordance with claim 15 wherein said at least one heat transfer apparatus is configured to receive at least a portion of the shifted syngas stream and a condensate stream, said at least one heat transfer apparatus is further configured to transfer heat from at least a portion of the shifted syngas stream to at least a portion of the condensate stream.

18. An IGCC power generation plant in accordance with claim 15 wherein said at least one gas shift reactor is coupled in flow communication with at least one apparatus configured to receive said substantially saturated high pressure steam stream and produce the superheated steam stream, said apparatus is coupled in flow communication with said least one steam turbine engine, said apparatus comprises at least one of:
- said at least one HRSG; and
- said at least one methanation reactor.

* * * * *